Dec. 2, 1941.  E. G. BODEN  2,264,739
OIL SEAL
Filed Oct. 20, 1939
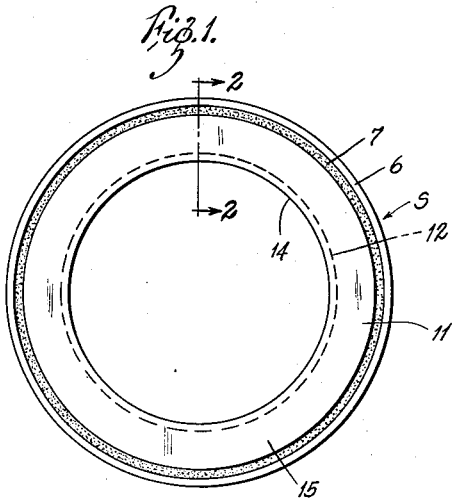
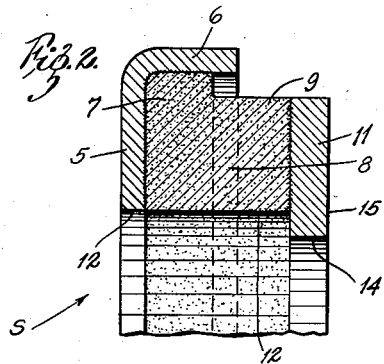
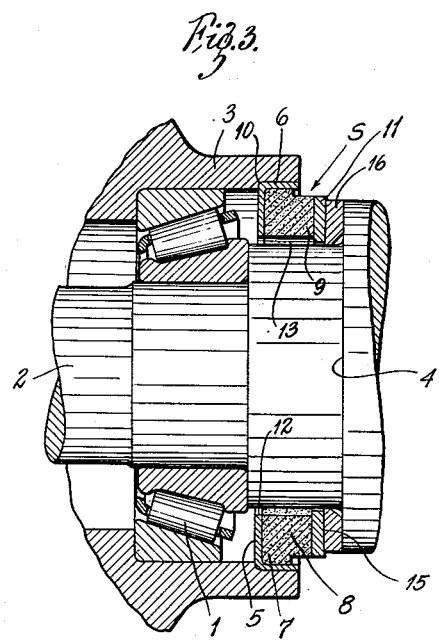
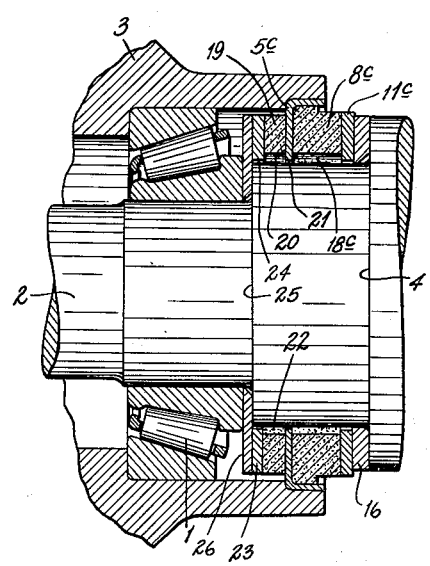
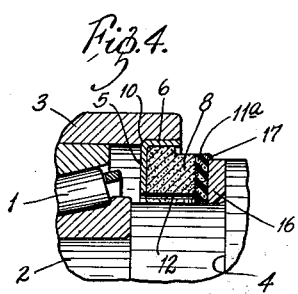
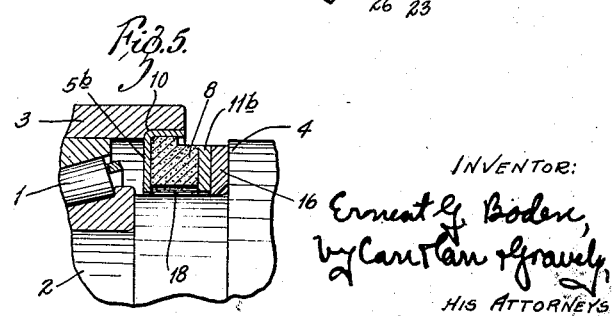
INVENTOR:
Ernest G. Boden,
by Carter and Gravely
HIS ATTORNEYS Patented Dec. 2, 1941

2,264,739

UNITED STATES PATENT OFFICE 2,264,739

OIL SEAL

Ernest G. Boden, Canton, Ohio, assignor to The Timken Roller Bearing Company, Canton, Ohio, a corporation of Ohio Application October 20, 1939, Serial No. 300,286

7 Claims. (Cl. 286—7)

This invention relates to devices for preventing the escape of oil and grease and also for excluding dirt and other unwanted matter from bearings. The principal objects of the present invention are to devise a simple, inexpensive, and efficient self-contained seal of compact construction which will seal against a flat surface and which will be resistant to wear; to devise a seal which will be easy to mount and replace, and to devise a seal which will have great flexibility in all directions. This invention consists in the sealing device and in the parts and combinations and arrangements of parts hereinafter described and claimed.

In the accompanying drawing, wherein like reference numerals refer to like parts wherever they occur, Fig. 1 is an end view of a sealing ring embodying my invention, Fig. 2 is a sectional view, on an enlarged scale, taken on line 2—2 in Fig. 1, Fig. 3 is a longitudinal sectional view of the sealing ring and a bearing interposed between a housing and a shaft, Fig. 4 is a longitudinal sectional view of a modified form of sealing ring, Fig. 5 is a view similar to Fig. 4 of another modified form of sealing ring; and Fig. 6 is a view similar to Fig. 3 of another modified form of sealing ring.

In the constructions illustrated in Figs. 3 and 6 of the drawing, a taper roller bearing 1 is interposed between a shaft 2 and a housing 3.

According to the present invention, a bearing seal, indicated generally by S, is mounted on the shaft between the bearing 1 and a shoulder 4 on the shaft 2. The seal comprises three annular rings bonded together to form a unitary structure. The supporting ring or shell 5 of the seal adjacent to the bearing is of steel or other suitable material and preferably has a peripheral flange 6 extending over a portion 7 of the flexible middle ring 8 of the seal, whose outside diameter is such that it fits tight in the shell, the remainder 9 of said flexible ring being of smaller outside diameter. This flange is adapted to seat with a tight fit in a rabbet or recess 10 provided therefor in the housing 3. The flexible ring 8 is of suitable elastic material and is longer than the flange 6.

The flexible ring 8 is bonded, as by vulcanizing, to the supporting ring 5 and to the flange 6. The flexibility of the seal is increased by the fact that only a portion of the flexible ring is bonded to the flange 6 of the supporting shell 5.

Bonded to the flexible ring is the sealing ring 11 which has the same outside diameter as the body of the flexible ring. This sealing ring 11 is preferably made of self lubricating material such as oil or graphite impregnated bronze, hardened steel, graphitized natural or synthetic rubber, Bakelite products or other similar material of good wearing qualities. Fig. 3, however, illustrates a sealing ring 11 of non-deformable material such as hardened steel.

In Figs. 2 and 3, supporting ring 5 and the flexible ring 8 has central openings 12 of greater diameter than the shaft, thereby forming a recess 13 between the rings and the shaft. The sealing ring has a central opening 14 of smaller diameter than the supporting and flexible rings to bring the sealing ring closer to the shaft than the other rings.

The outer face 15 of the sealing ring 11 abuts against a washer 16 having a smaller outside diameter than the sealing ring. This washer seats against the shoulder 4 on the shaft.

The material which I contemplate using for making the flexible ring 8 is a treated rubber or synthetic rubber such as sponge Neoprene. Such material is not only elastic but is resistant to oil, water, grit and dirt.

The hereinbefore described device is adapted for wheel bearing constructions where it is necessary to seal against a flat face such as is found in tractor wheels, trucks, mine cars, and other similar constructions. The seal S is mounted in the housing recess and held between the bearing and the washer 16 abutting against the shoulder 4 on the shaft. As mounted, the flexible ring 8 is compressed and the pressure of the elastic ring is sufficient to force the outer face 15 of the sealing ring 11 tightly against the face of the washer 16 to prevent the escape of lubricant from the bearing or the entrance of water and dirt into the housing. Seals having flexible rings of various degrees of elasticity may be used to provide various degrees of unit pressure of the sealing face against the washer, but sponge synthetic or natural rubber is preferred.

It is noted that the flexible ring 8 also enables the seal to accommodate itself with great facility to the parts with which it is associated in practice. The elastic material and the proposed method as shown of bonding of the elastic material of the inner ring to the supporting ring and flange gives the seal great flexibility in all directions.

If any foreign material passes the sealing face, the recess between the flexible ring 8 and the supporting ring 5 and the shaft serves to prevent its entering into the housing. The centrifugal force caused by the rotation of the housing aids in retaining the foreign material in the recess and serves to prevent its entrance into the housing. As the sealing ring is closer to the shaft than the other rings, this also serves to hinder the passage of foreign material into the housing.

The modification shown in Fig. 4 is similar to the seal shown in Fig. 3 except that the sealing member 11a is made of deformable material such as natural or synthetic rubber. Said sealing ring 11a is of greater outside diameter than the adjacent washer 16 and the pressure of the sealing ring against the washer deforms the sealing ring thereby forming a sealing lip 17 overlapping the washer. This lip is adapted to further prevent the ingress of foreign matter into the housing.

The modification shown in Fig. 5 is also similar to the seal shown in Fig. 3 except that the supporting ring 5b has a smaller opening than the supporting ring 5 shown in Fig. 3. The recess 18 between the supporting ring 5b and the sealing ring 11b serves as a trap for any foreign matter which might have gotten past the sealing face and the supporting ring 5b, with its small bore having a close tolerance with the shaft, is adapted to aid in confining the foreign matter in the recess.

The modification shown in Fig. 6 is a double seal and has a supporting ring 5c, flexible ring 8c and a sealing ring 11c which are similar to the seal shown in Fig. 5. The outer face of the supporting ring 5c has a flexible ring 19 bonded thereto. This flexible ring 19 has a central opening 20 of greater diameter than the central opening 21 of the supporting ring 5c and a recess 22 is formed between the flexible ring 19 and the shaft which is similar to the recess 18c in the other portion of the seal between the other flexible ring 8c and the shaft. Bonded to the outer face of the flexible ring 19 is a sealing ring 23 similar to the sealing ring 11c but of smaller outside diameter to permit it to fit within the housing. The central opening 24 of this ring is of a similar diameter to that of the supporting ring 5c and the other sealing ring 11c or can be larger. Adjacent to the seal and abutting against a shoulder 25 on the shaft is a ring 26 against which this double seal abuts. The cone of the bearing is seated against said ring.

The double seal is similar in operation to the seal shown in Fig. 5 but has additional sealing capacity as a result of additional sealing surface of the sealing ring 23 abutting against the ring 26 adjacent to the bearing. The additional recess 22 further serves to prevent the ingress of foreign matter.

Obviously, other modifications may be made and I do not want to be limited to the precise constructions shown. The seal can be used for rotating shaft applications as well as rotating housing as shown.

What I claim is:

1. A sealing device comprising a supporting ring having a peripheral flange for mounting in a recess, an elastic ring having the compressible characteristic of sponge rubber bonded to said supporting ring and its peripheral flange and having a body portion of reduced outside diameter projecting beyond the end of said supporting ring flange and a sealing ring bonded to the free end of said elastic ring.

2. A sealing device as set forth in claim 1, wherein the sealing ring is of smaller inside diameter than the elastic ring.

3. A sealing device as set forth in claim 1 wherein the sealing ring is made of deformable material.

4. A sealing device comprising a supporting ring having a peripheral flange for mounting in a recess, an elastic ring having the compressible characteristic of sponge rubber bonded to said supporting ring and its peripheral flange and having a body portion of reduced outside diameter projecting beyond the end of said supporting ring flange and a sealing ring bonded to the end of said elastic ring, the central opening in said elastic ring being of larger diameter than the central openings of said sealing ring and said supporting ring.

5. A sealing device comprising a supporting ring having a peripheral flange for mounting in a recess, an elastic ring having the compressible characteristic of sponge rubber bonded to the inner face of said supporting ring and to its peripheral flange and having a body portion of reduced outside diameter projecting beyond the end of said supporting ring flange, a sealing ring bonded to the outer face of said elastic ring, a second elastic ring bonded to the other face of said supporting ring and a sealing ring bonded to the end face of said second elastic ring.

6. A sealing device as set forth in claim 5 wherein the central openings of said elastic rings are of greater diameter than those of said sealing rings and said supporting ring.

7. A sealing ring assembly adapted for mounting as a complete preassembled unit in a recess, said sealing ring assembly comprising a ring having an external peripheral flange for mounting in said recess, an elastic ring having the compressible characteristic of sponge rubber seated in said ring and projecting beyond the end of the external peripheral flange thereof, and a sealing ring seated against the projecting end of said elastic ring, said elastic ring being permanently bonded to the inside faces of said ring and said circumferential flange and to the opposing radial face of said sealing ring.

ERNEST G. BODEN.